United States Patent
Peng et al.

(10) Patent No.: US 12,231,751 B1
(45) Date of Patent: Feb. 18, 2025

(54) MODULAR OMNI-DIRECTIONAL SENSOR ARRAY ENCLOSURE

(71) Applicants: Timothy Li-Ming Peng, Alexandria, VA (US); Eric Wayne Stacy, King George, VA (US); David Bone Clark, III, Fredericksburg, VA (US)

(72) Inventors: Timothy Li-Ming Peng, Alexandria, VA (US); Eric Wayne Stacy, King George, VA (US); David Bone Clark, III, Fredericksburg, VA (US)

(73) Assignee: United States of America, represented by the Secretary of the Navy, Arlington, VA (US)

( * ) Notice: Subject to any disclaimer, the term of this patent is extended or adjusted under 35 U.S.C. 154(b) by 24 days.

(21) Appl. No.: 18/109,303

(22) Filed: Feb. 14, 2023

(51) Int. Cl.
| H04N 23/51 | (2023.01) |
| G03B 17/02 | (2021.01) |
| H04N 23/698 | (2023.01) |
| H04N 23/90 | (2023.01) |

(52) U.S. Cl.
CPC ............ *H04N 23/51* (2023.01); *G03B 17/02* (2013.01); *H04N 23/698* (2023.01); *H04N 23/90* (2023.01)

(58) Field of Classification Search
CPC ...... H04N 23/51; H04N 23/698; H04N 23/90; G03B 17/02
USPC .......................................................... 348/36
See application file for complete search history.

(56) References Cited

U.S. PATENT DOCUMENTS

| 7,463,280 B2* | 12/2008 | Steuart, III | H04N 23/51 348/42 |
| 7,710,463 B2* | 5/2010 | Foote | G06T 3/4038 348/36 |
| 8,339,394 B1* | 12/2012 | Lininger | G06T 19/20 345/419 |
| 8,482,608 B1* | 7/2013 | Sandoval | H04N 23/51 348/151 |
| 9,575,394 B1* | 2/2017 | Wallace | H04N 23/51 |
| 9,609,234 B1* | 3/2017 | Checka | H04N 23/45 |
| 9,851,623 B2* | 12/2017 | Macmillan | G03B 37/04 |
| 9,921,464 B1* | 3/2018 | Choi | F16M 13/04 |
| D824,990 S * | 8/2018 | Greenthal | D16/242 |
| 10,230,904 B2* | 3/2019 | Cabral | H04N 23/90 |
| 10,291,828 B1* | 5/2019 | Hsu | H04N 23/698 |
| 10,302,744 B1* | 5/2019 | Krishnan | B60R 11/04 |
| 10,397,453 B2* | 8/2019 | Choi | H04N 23/45 |
| 10,577,125 B1* | 3/2020 | Burtt | G03B 15/006 |
| 10,795,239 B2* | 10/2020 | Nam | H04N 23/45 |
| 10,819,970 B2* | 10/2020 | Van Hoff | H04N 23/662 |
| 10,824,055 B1* | 11/2020 | McGuire | F21S 4/28 |
| 11,128,785 B2* | 9/2021 | Davenel | H04N 23/695 |
| 11,388,317 B1* | 7/2022 | Chen | G08B 13/19619 |
| 2004/0075571 A1* | 4/2004 | Fong | H01H 35/025 340/689 |

(Continued)

*Primary Examiner* — Tung T Vo

(74) *Attorney, Agent, or Firm* — Gerhard W. Thielman

(57) ABSTRACT

A modular omni-directional sensor array (MOSA) enclosure is provided for visual surveillance. The MOSA enclosure is disposable on an elevated position and includes a lower equipment module and an upper optical module. The equipment module contains electrical power and control electronics and is disposed on the elevated position from underneath. The optical module contains a plurality of cameras viewing radially outward. The optical module is disposed onto the equipment module from above.

11 Claims, 7 Drawing Sheets

(56) References Cited

U.S. PATENT DOCUMENTS

| | | | |
|---|---|---|---|
| 2007/0206945 A1* | 9/2007 | DeLorme | G03B 41/00 |
| | | | 396/332 |
| 2010/0033371 A1* | 2/2010 | Kumagai | G01S 19/14 |
| | | | 342/357.31 |
| 2011/0249100 A1* | 10/2011 | Jayaram | H04N 13/239 |
| | | | 348/48 |
| 2012/0154521 A1* | 6/2012 | Townsend | H04N 23/90 |
| | | | 348/E5.026 |
| 2014/0160274 A1* | 6/2014 | Ishida | G03B 37/04 |
| | | | 348/113 |
| 2016/0349600 A1* | 12/2016 | Macmillan | G03B 37/04 |
| 2016/0352982 A1* | 12/2016 | Weaver | H04N 23/695 |
| 2018/0210322 A1* | 7/2018 | Malukhin | H04N 23/50 |
| 2018/0302611 A1* | 10/2018 | Baak | G01S 7/4808 |
| 2019/0113826 A1* | 4/2019 | Nam | G02B 23/16 |
| 2019/0227412 A1* | 7/2019 | Malukhin | G06T 19/006 |
| 2020/0240604 A1* | 7/2020 | Patton | F21V 3/0625 |
| 2020/0262396 A1* | 8/2020 | Keller | B60S 1/60 |
| 2022/0306048 A1* | 9/2022 | Regalbuto | B08B 3/02 |
| 2024/0132023 A1* | 4/2024 | Herman | B08B 3/02 |

\* cited by examiner ous visual surveillance. The flange 120 represents an elevated position to enable visual monitoring and/or observation.

MODULAR OMNI-DIRECTIONAL SENSOR ARRAY ENCLOSURE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to optical surveillance platforms. In particular, the invention relates to platforms for continuous omni-directional visual monitoring.

Conventionally, visual situational awareness is available only through distribution of individual wide field-of-view (FoV) cameras that are limited in their ability to provide wide coverage on a continuous basis. When paired with pan or tilt capabilities, wider fields of view are possible but not as a continuous 360° foV. Additionally, pan and tilt carries a greater risk of failure owing to the use of motors and the environmental exposure of the mechanical translation systems. Lastly, combined feeds from individual fixed cameras with different focal origins often results in lost data when using computer vision models.

SUMMARY

Conventional mast-mounted visual monitors yield disadvantages addressed by various exemplary embodiments of the present invention. In particular, various exemplary embodiments provide a modular omni-directional sensor array (MOSA) enclosure for visual surveillance. The MOSA enclosure is disposable on an elevated position and includes a lower equipment module and an upper optical module. The equipment module contains electrical power and control electronics and is disposed on the elevated position from underneath. The optical module contains a plurality of cameras viewing radially outward. The optical module is disposed onto the equipment module from above.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches ("), mass in grams (g) or pounds-mass ($lb_m$), time in seconds(s), angles in degrees (°), force in newtons (N), temperature in kelvins (K), electric potential in volts (V), energy in joules (J), and frequencies in hertz (Hz) Electric power can be supplied by either direct current (DC) or alternating current (AC). Supplemental measures can be derived from these, such as density in grams-per-cubic-centimeters ($g/cm^3$), moment of inertia in gram-square-centimeters ($kg-m^2$) and the like.

Figure 1:
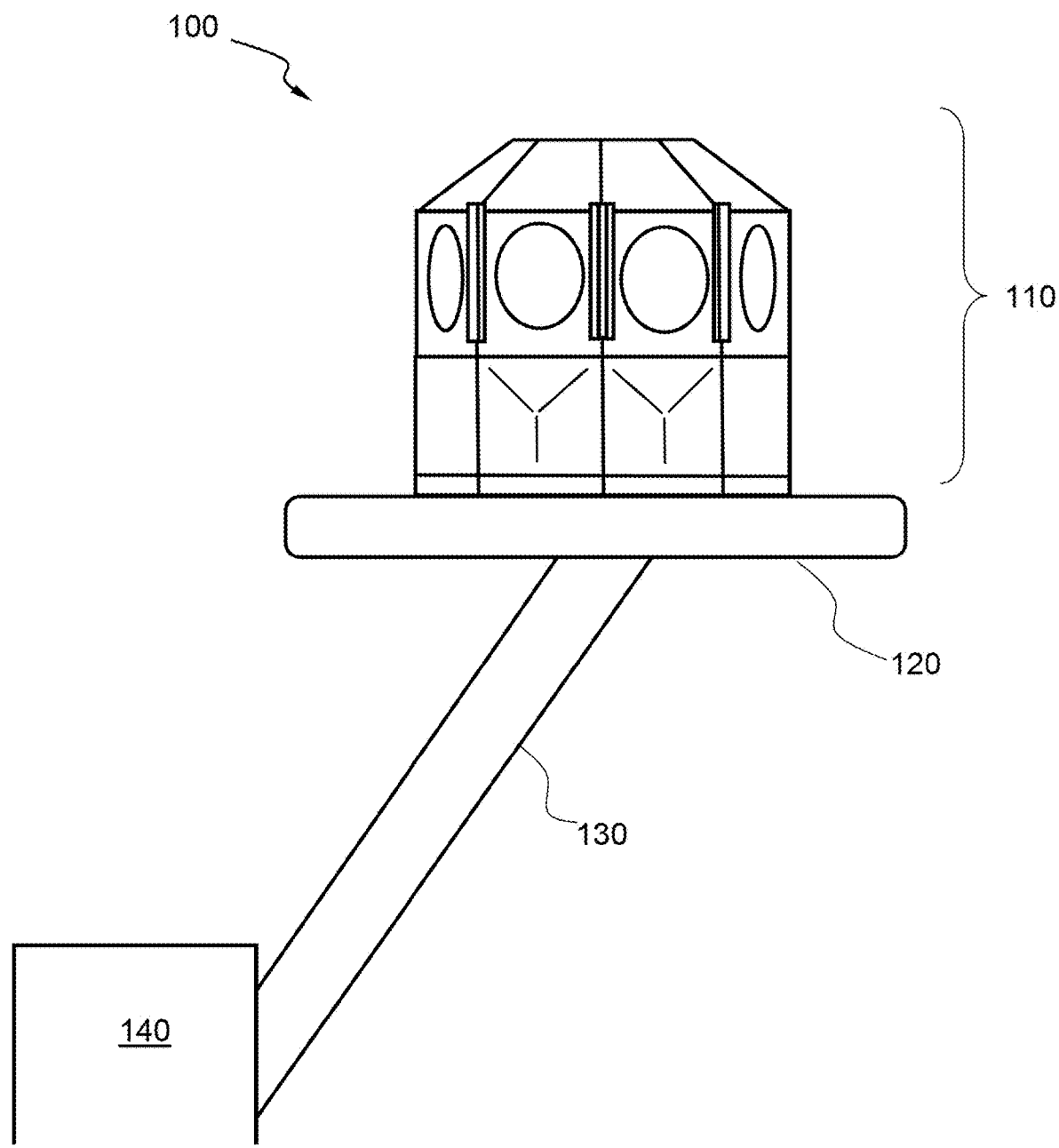
FIG. 1 is an elevation view of an exemplary visual observation platform disposed on a mast.

FIG. 1 shows an elevation view 100 of a modular omni-directional sensor array (MOSA) enclosure 110 as installed on a flange 120 supported by a strut 130 as attached to a mast 140, such as aboard a combat vessel. The MOSA enclosure 110 constitutes an omni-directional platform for continuous visual surveillance. The flange 120 represents an elevated position to enable visual monitoring and/or observation.

Figure 2:
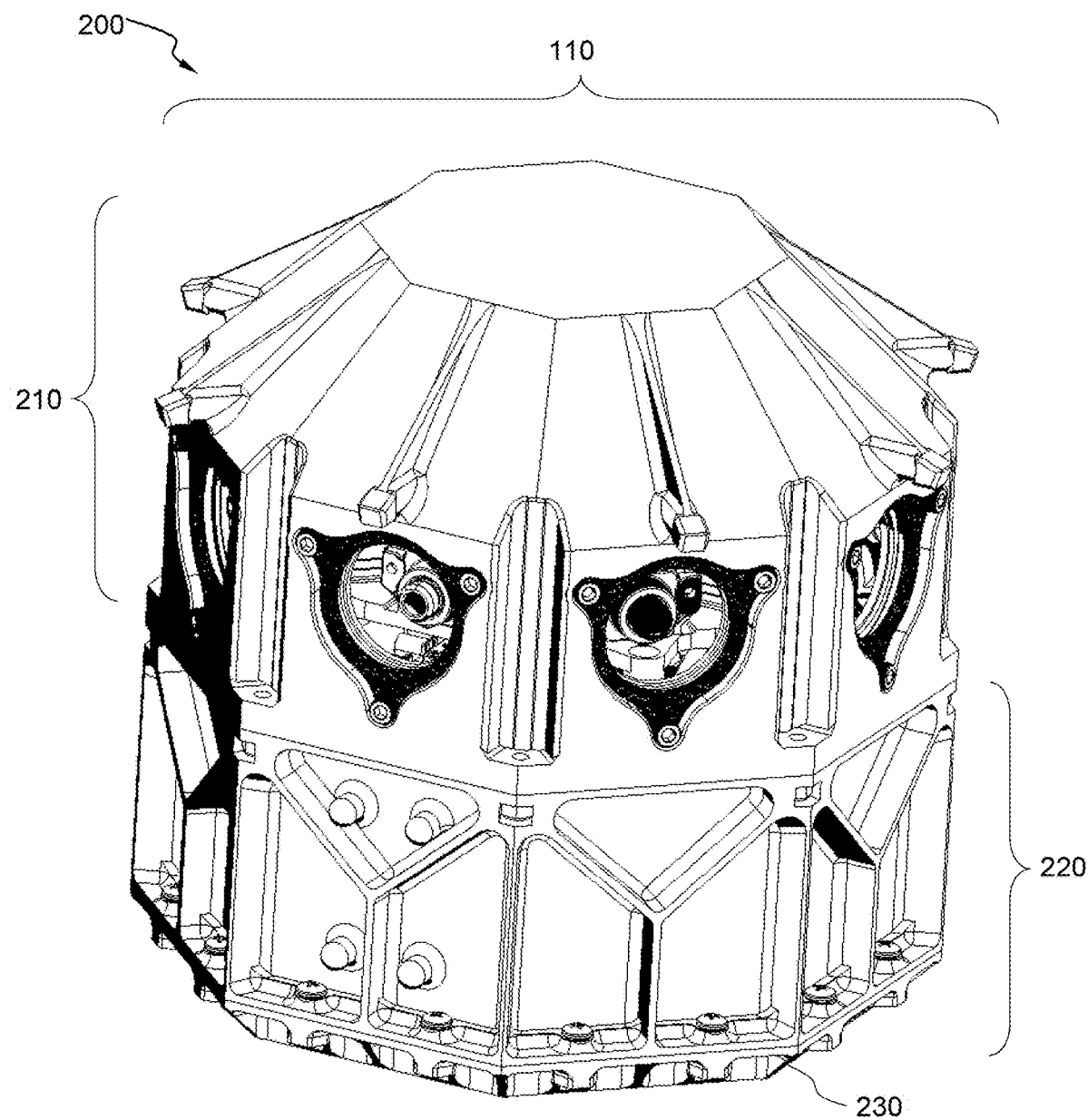
FIG. 2 is a perspective assembly view of the platform.

The MOSA enclosure 110 has a mass of 13 or 14 $lb_m$, a height of 12.5" and a width of 11". FIG. 2 shows a perspective view 200 of the MOSA enclosure 110 comprising an upper optical module 210 and a lower equipment module 220 capped by a base plate 230 for attaching to the flange 120. Both optical and equipment modules 210 and 220 are preferably octagonal in planform.

Figure 3:
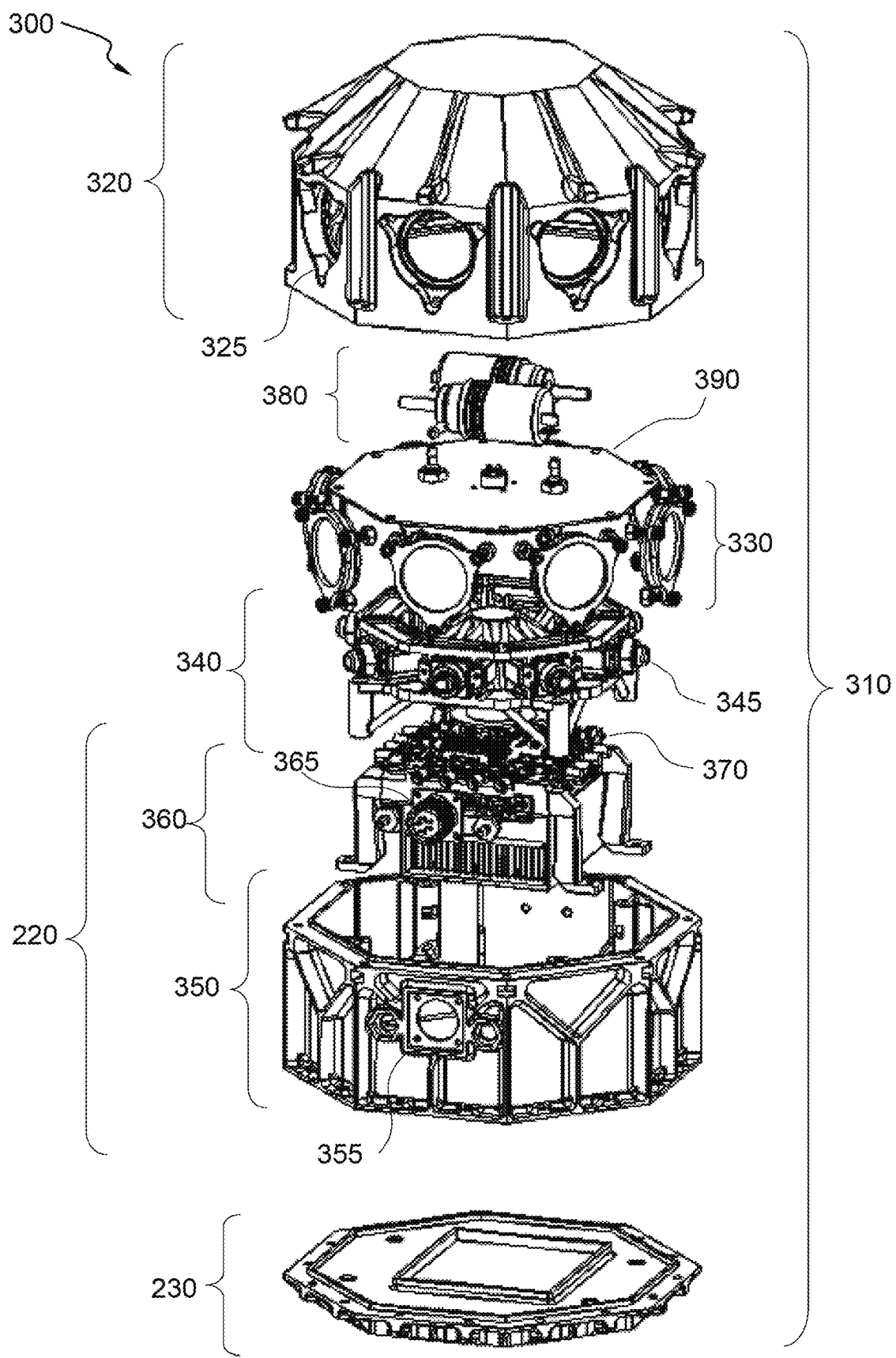
FIG. 3 is a perspective exploded view of platform components.

FIG. 3 shows a perspective exploded view 300 of modules 310 that comprise the MOSA enclosure 110. The equipment therein includes commercial off-the-shelf (COTS) components. The optical module 210 includes an optical cover 320 with cavities 325 and eight optical lens windows 330 contained within a camera frame 340. These viewport windows 330 form a symmetrical octagonal arrangement along the periphery of the optical module 210 for radially outward visual observation in all directions.

The windows 330 are angularly separated by 45° each. Eight COTS cameras 345 mount to the frame 340 and peer out their corresponding windows 330 aligned to their cavities 325 in the optical cover 320. The FoV for each camera 345 can be set to overlap coverage with adjacent units. This enables the combination of windows 330 to enable full 360° foV coverage (beyond a practical focal distance) for all cameras 345 operating. Such cameras 345 can sense radiation reflected or emitted in the visible spectrum, or alternatively in the infrared, whichever intended.

The exemplary MOSA enclosure 110 has the purpose of providing a platform, suitable for the marine environment, for multiple fixed position cameras 345. The MOSA enclosure 110 supports a continuous 360° optical field-of-view (FoV) for enhanced visual situational awareness on manned and unmanned maritime vessels. The MOSA enclosure 110 provides a central location, in a ruggedized casement, that enables optimal disposition of multiple cameras 345 on a common focal plane for reduced computer model degradation.

The equipment module 220 includes an octagonal housing 350 that contains a card holder 360 comprising a Nvidia® Jetson AGX Xavier developer kit having a connector port 365. The base plate 230 is disposed beneath the housing 350. An FPD-Link™ III Interface card 370 mounts to the Jetson AGX holder 360.

The optical cover 320 houses a pair of optical cleaning pumps 380 disposed on a floor 390 composed of carbon fiber. The pumps 380 are preferably COTS automotive pumps for windshield-wiper cleaners. The cover 320 and housing 350 can be composed from powder nylon (i.e., polyimide 12) via additive manufacturing, also called three-dimensional (3D) printing. Alternative corrosion-resistant waterproof materials can also be considered without departing from the claim scope.

Figure 4:
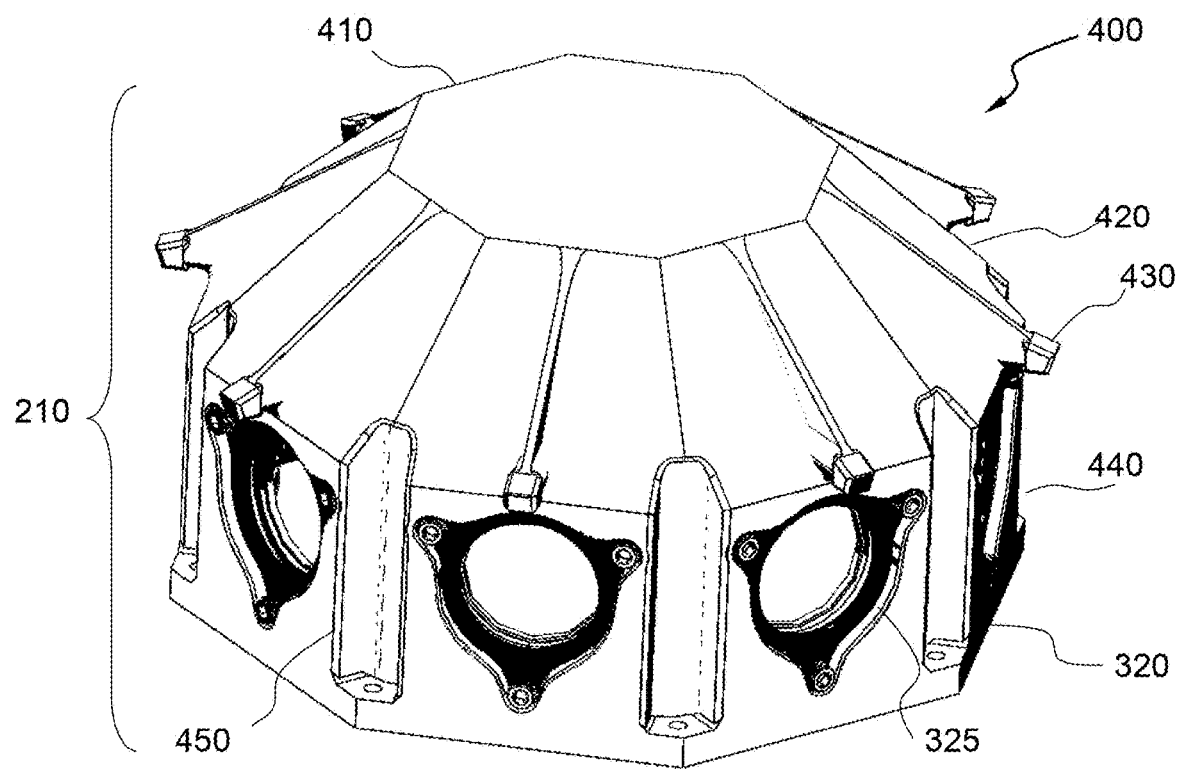
FIG. 4 is a perspective assembly view of an upper module.

FIG. 4 shows a perspective assembly view 400 of the optical module 210. The cover 320 forms an octagonal flat top 410 that connects to a sloped roof 420 with cleaning jets 430 extending as radial protrusions along the edges of the roof 420 above their corresponding cavities 325. Vertical walls 440 support the roof 420 and contain the windows 330. Angled flanges 450 attach to the corners of the octagonal walls 440 for fasteners to enclose the equipment module 220.

Figure 5:
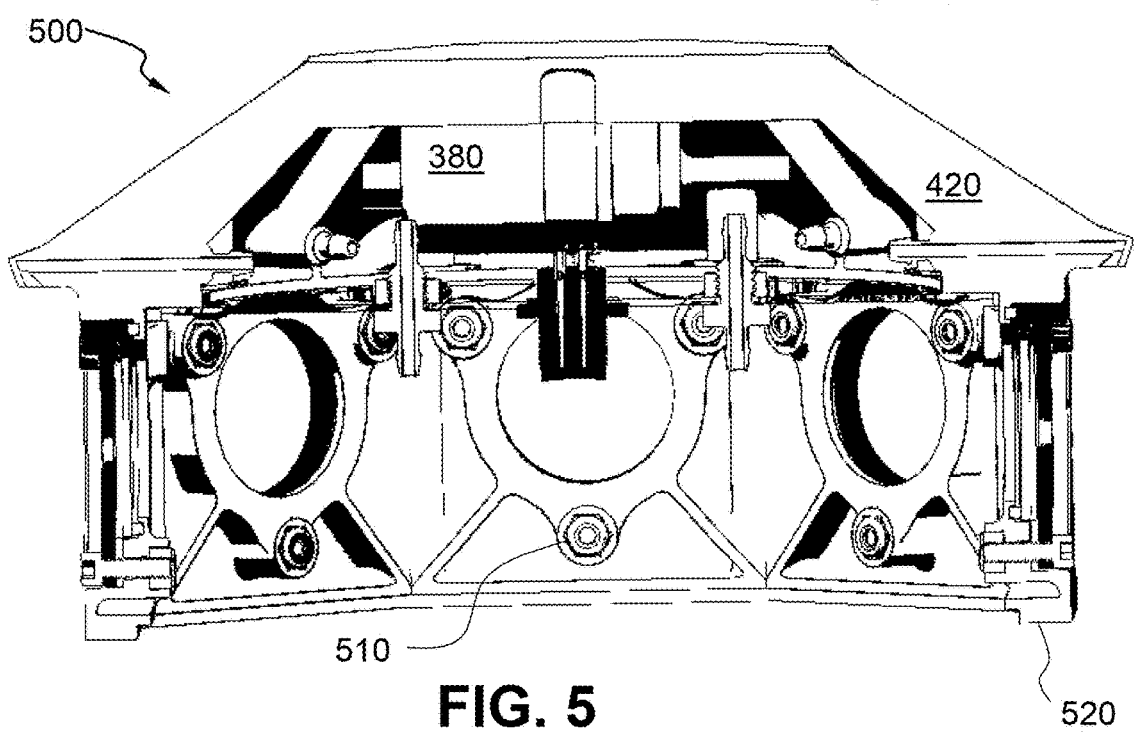
FIG. 5 is a perspective cutaway view of the upper module.

FIG. 5 shows a perspective cutaway view 500 of the optical module 210. The pumps 380 are suspended within the roof below the top 410. A triplet of nuts 510 secure viewport components to the cavities 325. The vertical walls 440 end in a bottom rim 520 opposite the roof 420.

Figure 6:
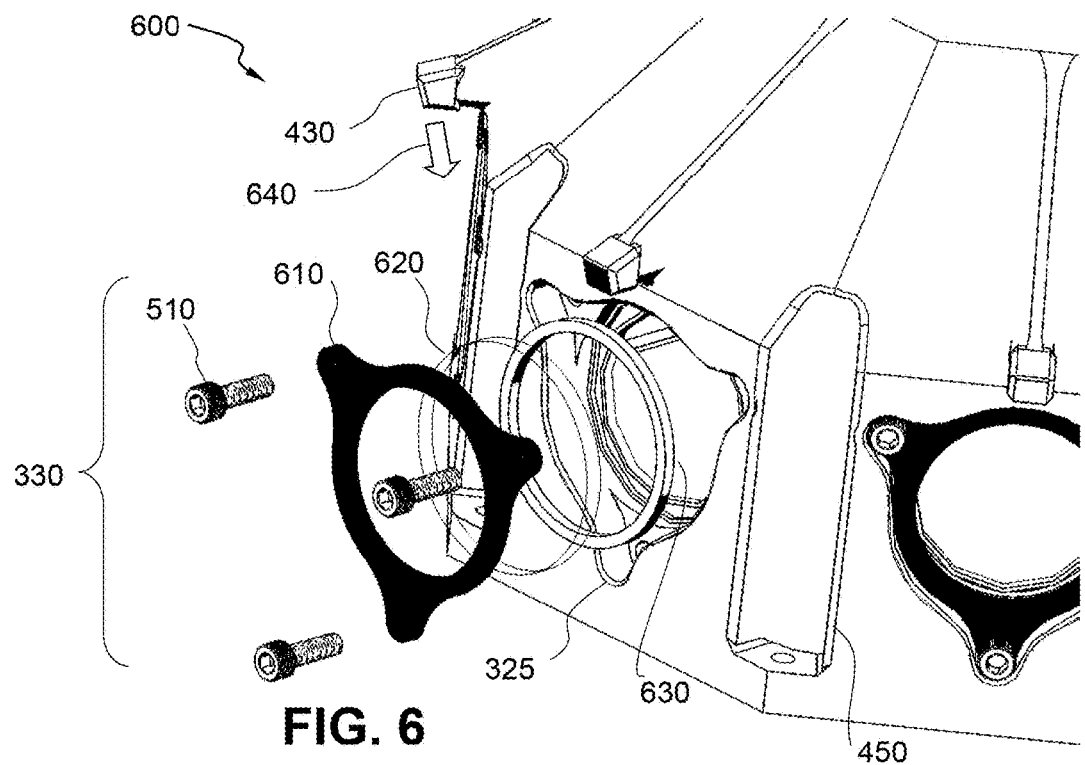
FIG. 6 is a perspective exploded view of window components.

FIG. 6 shows a perspective exploded view 600 of the windows 330 in the optical module 210. Each window 330 includes a carbon-fiber spreader 610, a transparent disk 620, and an O-ring 630 that all insert into their corresponding cavity 325 and secured by bolts 510. The cleaning jets 430 spray fluid downward and radially inward shown by arrow 640 onto the transparent disks 620 to wash off salt spray that accumulates on the front faces of the windows 330 from exposure to their marine environment.

Figure 7A:
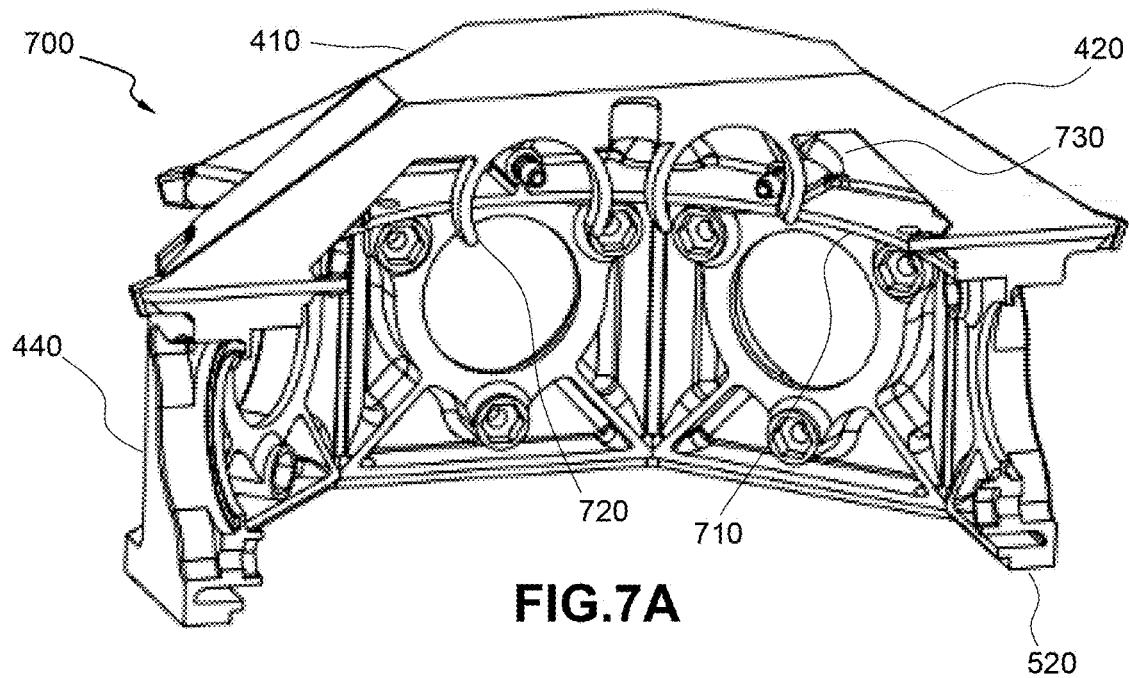
FIGS. 7A and 7B are perspective views of the upper module.
Figure 7B:
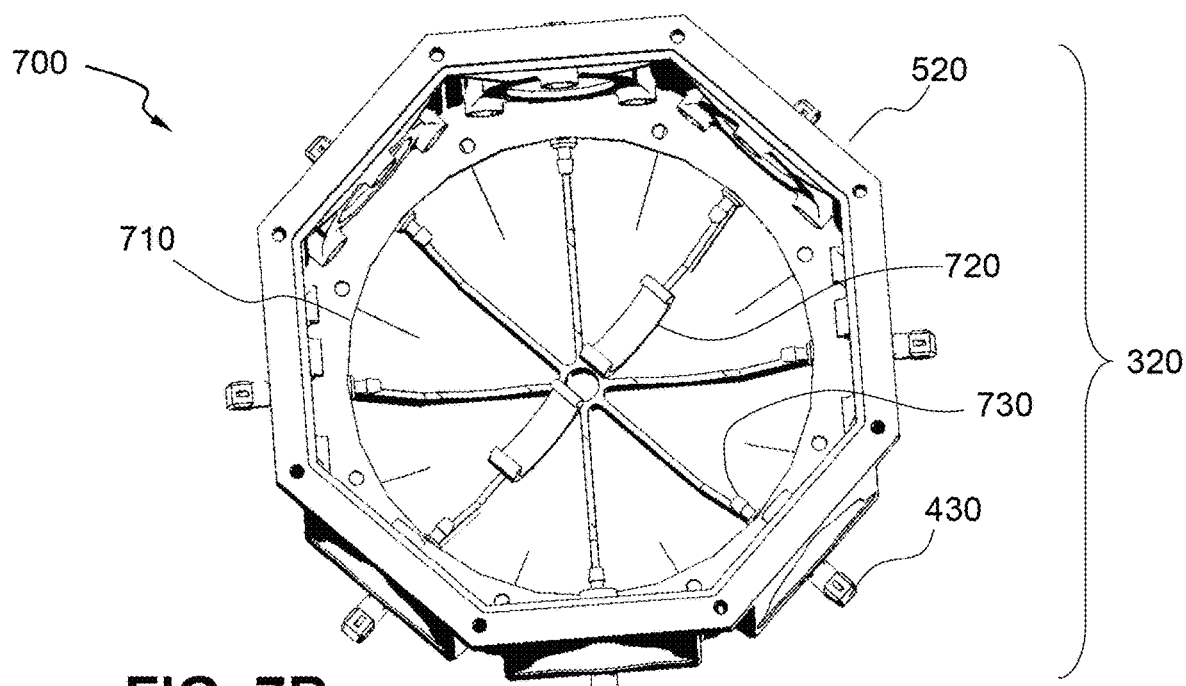

FIGS. 7A and 7B show a perspective cutaway and interior views 700 of the optical cover 320, which includes an interior ring 710 between the roof 420 and the walls 440. Arc clips 720 extending from the roof 420 support the pumps 380. Inner feed conduits 730 extend radially inward from the cleaning jets 430 over the ring 710. Cleaner fluid supplied via the pumps 380 feeds into the conduits 730 to spray onto the disks 620 via nozzles on the jets 430 for removing salt spray accumulation from exterior faces of the transparent disks 620.

Figure 8:
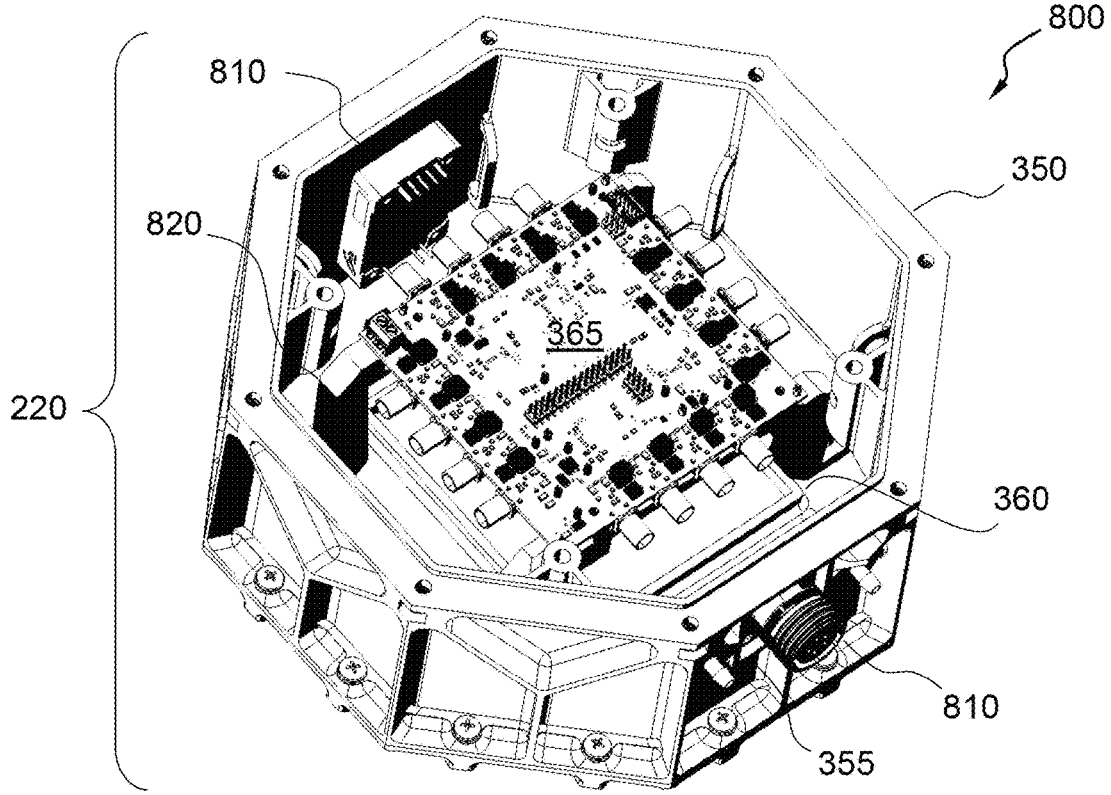
FIG. 8 is a perspective view of a lower module.

FIG. 8 shows a perspective assembly view 800 of the equipment module 220. The octagonal housing 350 contains the Jetson AGX holder 360 and related components that operate to provide operational control for the cameras 345. The electrical connector port 365 provides 24 V of regulated voltage potential from the vessel to feed a DC-DC convertor 810 inside the housing 350 of the equipment module 220. The FPD-Link™ III Interface card 370 mounts to the Jetson AGX holder 360 by AM brackets 820. The DC-DC convertor 810 steps down the voltage to 12 V for powering the Jetson AGX holder 360, its FPD-Link™ III Interface card 370, and several cooling fans.

Figure 9A:
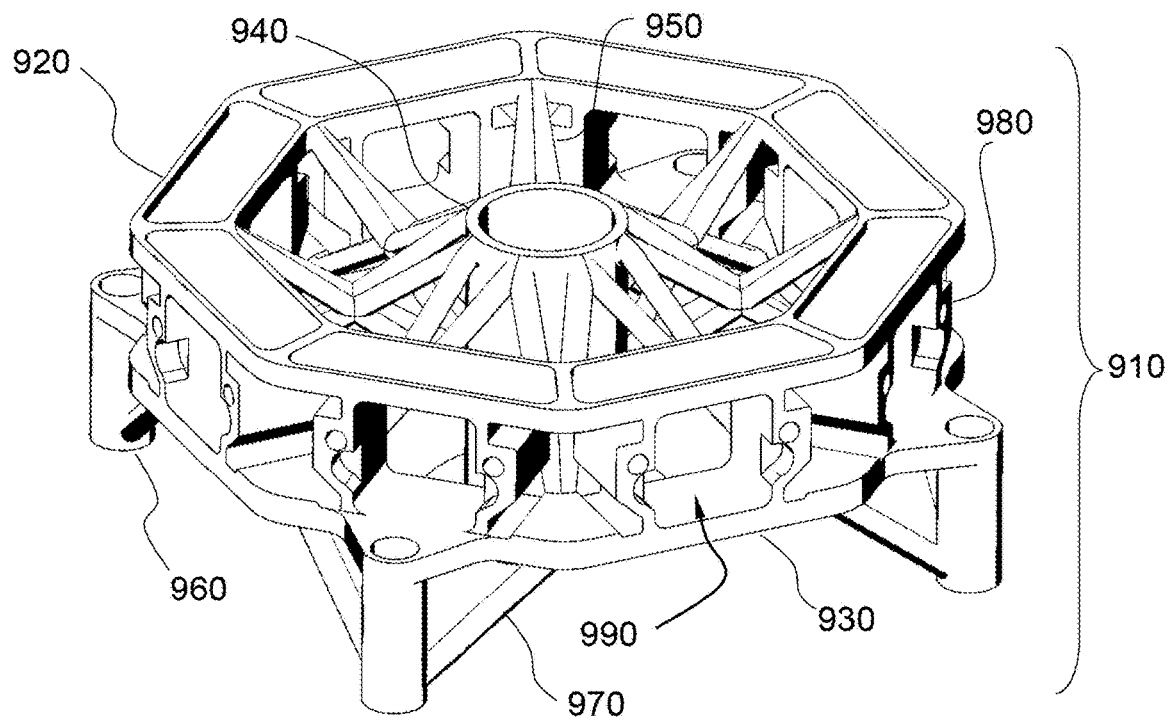
FIGS. 9A and 9B are perspective views of a camera frame.
Figure 9B:
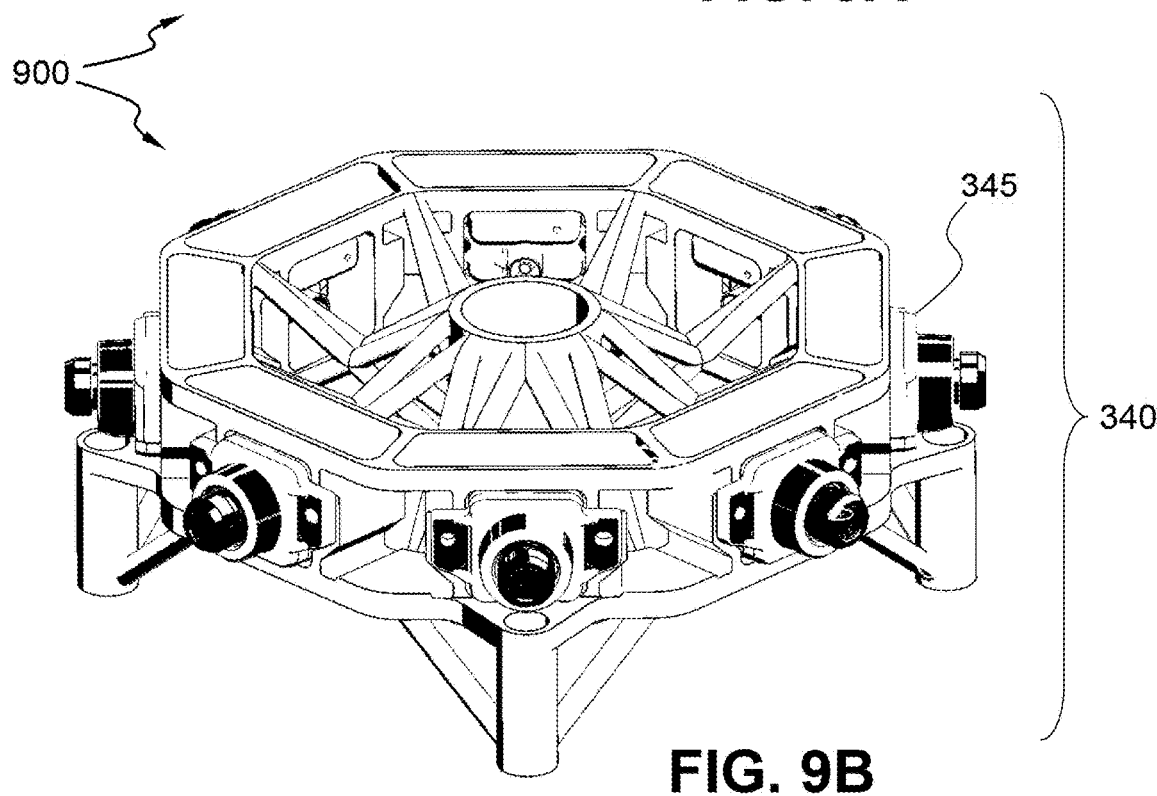

FIGS. 9A and 9B show perspective views 900 of the camera frame 340 that includes the frame structure 910. This includes upper and lower hexagonal rims 920 and 930 that connect to an annular center post 940 via bent spokes 950.

Eight legs 960 support the lower rim 930, reinforced by diagonal spars 970. Braces 980 connect between the rims 920 and 930 to contain the cameras 345 within designated cavities 990. A tube can also be inserted through the hollow post 940 to supply the pumps 380 with cleaning fluid, such as water. The structure 910 is preferably composed from nylon via 3D printing.

The MOSA enclosure 110 is assembled by first mounting the NVIDIA Jetson AGX and Designcore Nvidia Jetson AGX Link™ III interface card 370 to the brackets 820 on the Jetson AGX Xavier 360. This controller assembly attaches to the housing 350, which then bolts to the base plate 230. The COTS cameras 345 insert between the braces 980 with cables feeding through the central post 940. Next the lower housing 350 bolts to the base plate 230, and the camera frame 340 bolts to the lower housing 350. The pumps 380, optical windows 330, and camera frame 340 are assembled to the cover 320.

The camera frame 340 mounts eight cameras 345. Each optical window 330 secures to the cover 320 using the O-ring 630 to hermetic seal the transparent disk 640. The spreader 610 conforms to the window 330 to distribute the fastening load from the bolts 510. Finally, the assembled cover 320 is secured along its rim 520 to the lower housing 350.

The camera array holder 340 preferably accommodates eight D3RCM-OV10640-953 cameras 345 purchased from D3 Engineering. FPD-Link™ III cables connect each camera 345 to the Designcore Nvidia Jetson AGX Xavier FPD-Link™ III Interface card 370, which subsequently connects to Jetson AGX Xavier MIPM CSI data lanes. Images from the cameras 345 can be monitored via closed-circuit and/or recorded as desired.

The housing 350 contains a DC-DC convertor 810 of 24 V input power to supply 12 V output power to the Jetson AGX Xavier 360, Designcore Nvidia Jetson AGX Xavier FPD-Link™ III interface card 370, as well as cooling fans. The Jetson AGX Xavier 360 connects via the port 365 to an RJ45 network cable that sends video and target data to the platform. Overall, the MOSA enclosure 110 protects the cameras 345 and Jetson AGX Xavier 360 and other related electrical equipment from maritime environmental conditions.

The vessel supplies DC electrical power with regulated voltage of 24 V through the connector port 365 to the equipment module 220 rather than internally by batteries. The supplied electrical power feeds to the DC-DC converter 810 to reduce this potential to 12 V that connects to Jetson AGX Xavier 360 and FPD-Link™ III interface card 370. Thus DC power is supplied to the Designcore Nvidia Jetson AGX Xavier FPD-Link™ III interface card 370 for distribution to each camera 345 for operation through the FPD cable. The port 365 can also provide Ethernet connection.

Once assembled in accordance with exploded view 300, the modular omni-directional sensor array (MOSA) enclosure 110 mounts to the flange 120 on the mast 140 of the maritime platform, via the base plate 230 as shown in view 100. The input power of 24 V connects through a maritime connector at port 365. The RJ45 network cables connect to the network switch on the flange 120 to stream video and data for omni-directional awareness.

There are several distinct advantages to this modular omni-directional sensor array (MOSA) enclosure 110. The all-in-one feature enables sensing, processing, and output of video from within the confines of the enclosure to the platform. In addition, cooling fans and a heat sink in the design mitigate the risk of overheating. One of the cooling fans was disposed directly under the Jetson AGX Xavier 360 against its Jetson AGX Xavier heat sink. In addition, the housing 350 can include a pair of fans mounted to the sides.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A modular omni-directional sensor array (MOSA) enclosure for visual surveillance, said MOSA enclosure disposable on an elevated position and comprising:
    a lower equipment module including a base plate and a polygonal prism housing connected thereto that contains electrical power and control electronics, said base plate disposed on the elevated position from underneath; and
    an upper optical module including a rooftop, a plurality of walls extending axially from said rooftop, a polygonal frame that contains a plurality of cameras viewing radially outward, each wall of said plurality of walls having a viewport window, each said window having a transparent cover, said plurality of walls containing said frame and being disposed onto said equipment module from above.

2. The MOSA enclosure according to claim 1, wherein said polygonal prism housing and plurality of walls are octagonal in planform, and said plurality of cameras is eight.

3. The MOSA enclosure according to claim 1, wherein said prism housing includes a holder that contains said power and electronics.

4. The MOSA enclosure according to claim 3, wherein said frame is disposed onto said holder.

5. The MOSA enclosure according to claim 1, wherein each camera of said plurality of cameras has a corresponding viewport window within said plurality of walls.

6. The MOSA enclosure according to claim 1, wherein said optical module includes a pump to eject cleaner fluid onto each said viewport window on said each wall of said plurality of walls.

7. The MOSA enclosure according to claim 6, wherein said pump is disposed on a floor within said roof.

8. The MOSA enclosure according to claim 6, wherein said pump ejects said fluid via a plurality of nozzles mounted onto said rooftop.

9. The MOSA enclosure according to claim 1, wherein said prism housing, said roof and said plurality of walls are composed from powder nylon.

10. The MOSA enclosure according to claim 1, wherein said plurality of walls includes a plurality of flanges for attaching a corresponding plurality of fasteners.

11. The MOSA enclosure according to claim 10, wherein each flange of said plurality of flanges attaches to a corresponding corner between adjoining walls of said plurality of walls.

* * * * *